United States Patent [19]

Duh

[11] Patent Number: 4,913,035
[45] Date of Patent: Apr. 3, 1990

[54] APPARATUS FOR MIST PREVENTION IN CAR WINDSHIELDS

[76] Inventor: Gabri C. B. Duh, No. 267, Lane 376, Sec. 1, Kwang-fu Rd., Hsinchu, Taiwan

[21] Appl. No.: 394,754

[22] Filed: Aug. 16, 1989

[51] Int. Cl.⁴ ............................................. B60H 1/26
[52] U.S. Cl. ..................................................... 98/2.13
[58] Field of Search ............................... 98/2.12, 2.13

[56] References Cited

U.S. PATENT DOCUMENTS

| | | | |
|---|---|---|---|
| 1,825,437 | 9/1931 | Yeagle | 98/2.13 |
| 1,942,225 | 1/1934 | Tibbetts | 98/2.13 X |
| 2,919,638 | 1/1960 | Mathews | 98/2.13 |
| 3,292,521 | 12/1966 | Requa | 98/2.13 |
| 3,294,439 | 12/1966 | Phillips, Jr. | 98/2.13 X |
| 3,434,408 | 3/1969 | Rivers et al. | 98/2.13 |

FOREIGN PATENT DOCUMENTS 2829241  1/1980  Fed. Rep. of Germany ....... 98/2.13

Primary Examiner—Harold Joyce
Attorney, Agent, or Firm—Notaro & Michalos

[57] ABSTRACT

A mist preventing apparatus for car windshields can be connected to the upper edge of the car's window and communicated the air inside and outside the car. The apparatus includes a U-shaped body with two end pieces adjustably engaged with both ends of the body for suiting cars of all sizes. It can remove the moisture on the windshield or prevent it from misting during driving on rainy days.

2 Claims, 3 Drawing Sheets

APPARATUS FOR MIST PREVENTION IN CAR WINDSHIELDS

BACKGROUND OF THE INVENTION

This invention relates to an apparatus for preventing mist on the windshield, of a car and more particularly to an apparatus which prevents the windshield from mist and keeps it clear to facilitate driving.

As everybody knows, on a rainy day, the windshield of a car is usually misty due to moisture and the different temperature between the inside and the outside of the car. It will fog the sight of the driver and disturb driving. A used method is often adopted by the driver to lead the cool air of the car air conditioner toward the inside face of the windshield to remove the mist. If in summer, most of the cool air brows to the windshield instead of to people in the car, the people will suffer in an undesirable manner. If in winter, any cool air is unacceptable. Another way to remove the mist is to open the window of the car but rain will fall into the car because of any small opening of the window. So, how to keep the windshield clearly on raily days, has become a big problem.

SUMMARY OF THE INVENTION

It is the purpose of this present invention to mitigate and/or obviate the above-mentioned drawbacks in the manner set forth in the description of the preferred embodiment.

A primary objective of the present invention is to provide a mist preventer apparatus which can keep the windshield clear by communicating the air inside the car and the temperature with the outside atmosphere.

Another objective of this invention is to provide a ventilation apparatus which is capable of preventing the windshield of a car from misting, and which presents rain from falling into the car.

A further objective of the invention is to provide an apparatus of mist preventer of car's windshield which can be made easily and cheaply and which is suited to cars of all sizes.

Further objectives and advantages of the present invention will become apparent as the following description proceeds, and from the features of novelty which are set forth in the claims annexed to and forming a part of this invention.

DETAILED DESCRIPTION OF THE PREFERRED EMBODIMENT

The following is a detailed description of the best presently contemplated embodiment of the invention. This description is not to be taken in a limiting sense, but is made merely for the purpose of illustrating the general principles of the invention.

Figure 1:
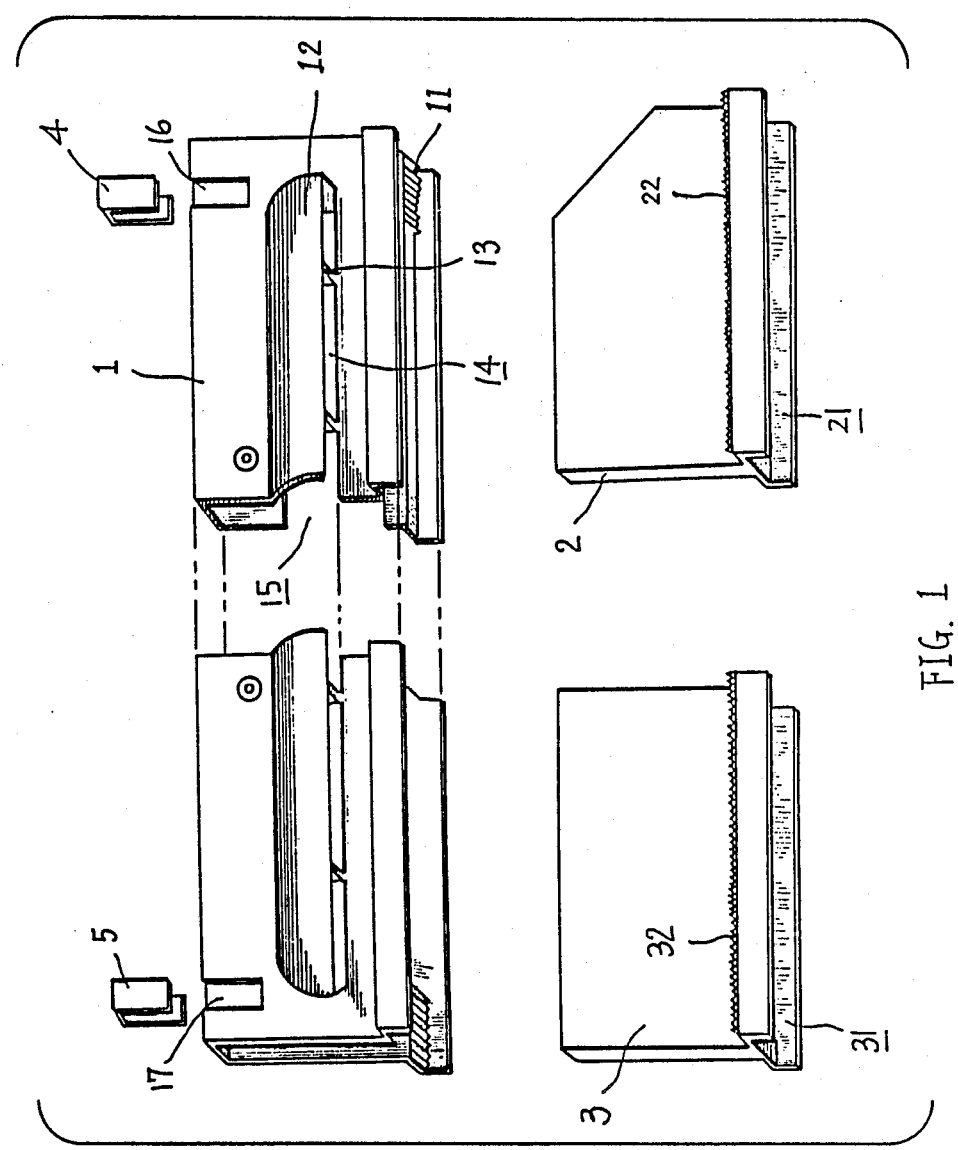
FIG. 1 is an exploded perspective view according to the present invention.

Now referring to FIG. 1 first, it can be seen that the present invention includes a U-shaped body 1 and two end pieces 2, 3, wherein the lower open edge of the body is formed to have a bigger U-shaped portion, and the lower ends of which are provided with tooth profiles. One side wall of the body 1 connects with a curved shield 12 with several reinforced ribs 13, and provides a ventage 14 therein. The other side wall of the body has a gap 15 which therefore communicates the spaces inside and outside. The two end pieces 2, 3 have similar profiles to the body. They are put into the inner space of the body and have at their bottom edges two upside-down U-shaped profiles 21 and 31. The top faces of the bottom profiles have tooth-racks 22, 32 for engaged with the tooth profiles 11 inside the body 1.

Figure 2:
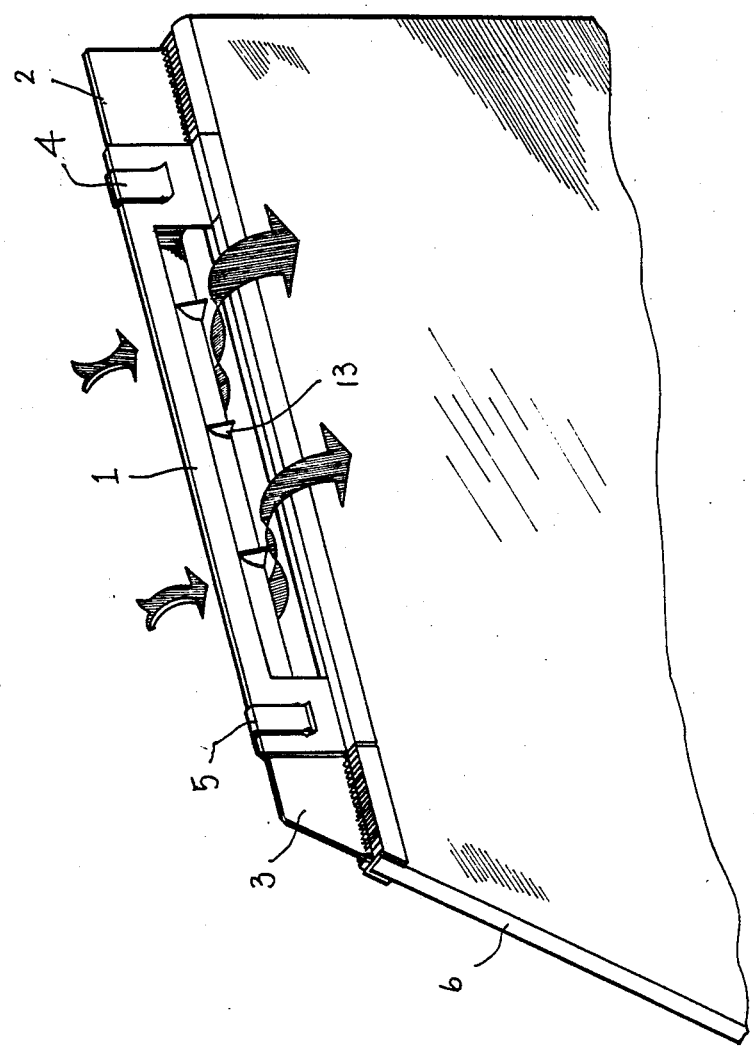
FIG. 2 is an assemble explanatory view of this invention.
Figure 3:
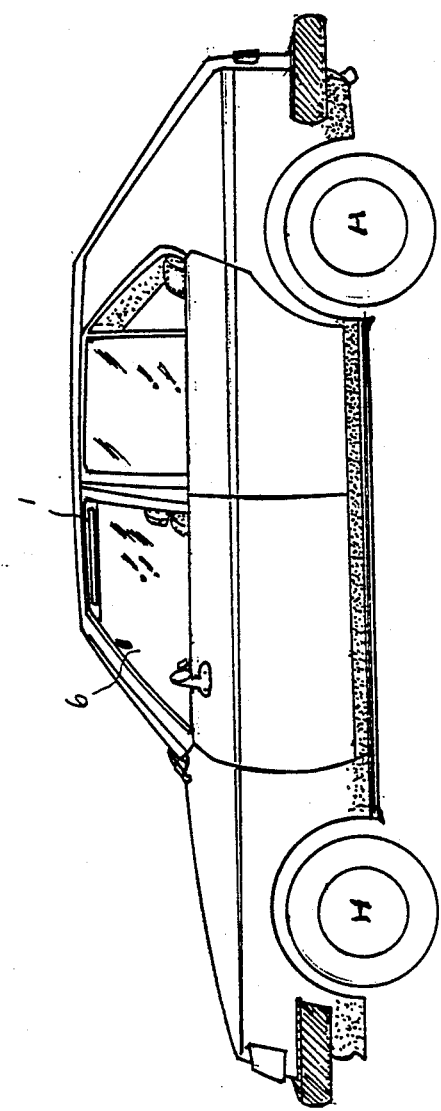
FIG. 3 is an exemplary embodiment in accordance with the present invention.

Referring to FIG. 2, during assembly, two end pieces 2, 3 are adjustably connected to both ends of the body 1 and therefore the apparatus is suited to cars of all sizes while the upper plates of side pieces are cut to fit with the window of the car. The means of the present invention is placed on the upper edge of the window when used. Two connectors 4, 5 are tightly engaged with recesses 16, 17 provided at both upper sides of the body 1 and at th upper closed edge thereof. After closing the window of the car, the used manner can be seen from FIG. 3. Due to the ventage communcating with the gap 15, the outside air is able to get into the car (as the arrows of figure show) when the car is moving. This communication is capable of bringing fresh air into the car and preventing the windshield from misting. Moreover, the rainwater will never fall into the car because of the curved shield provided. It is to be understood that this present invention can overcome the problem raised on a rainy day and obviously facilitate good vision for driving.

As various possible embodiments might be made of the above invention without departing from the scope of the invention, it is to be understood that all matter herein described or shown in the accompanying drawings is to be interpreted as illustrative and not in a limiting sense. Thus it will be appreciated that the drawings are exemplary of a preferred embodiment of the invention.

I claim:

1. An apparatus for preventing mist on the windshield of a car which has a window with an edge, comprising:
   a U-shaped body having a pair of side walls defining an interior space, opposite ends, a closed edge between the side walls and an open edge between the side walls, the U-shaped body including a U-shaped portion connected to the open edge, the U-shaped body including tooth profiles thereon at least adjacent the opposite ends of the U-shaped body, the U-shaped body including a curved shield connected to one of the side walls, a plurality of reinforced ribs connected to the shield, the one side wall having ventage openings therethrough positioned under the curved shield, the opposite side wall having a gap therethrough for the passage of air across the side walls through the gap and through the ventage openings, the U-shaped body including a pair of recesses adjacent the opposite ends of the U-shaped body;
   a pair of end pieces, each end piece having a portion for insertion into the interior space of the U-shaped body adjacent one opposite end thereof, each end piece having a U-shaped profile at one edge thereof shaped to be received in the U-shaped portion of the U-shaped body, the U-shaped profile of each end piece having a tooth-rack for engaging the tooth profiles of the U-shaped portion of the U- shaped body for engaging the end pieces at the opposite ends of the U-shaped body; and a pair of connectors each engaged over one of the recesses of the U-shaped body for holding the end pieces to the U-shaped body.

2. An apparatus according to claim 1 wherein the open edge of the U-shaped body forms the lower edge of the U-shaped body; the tooth profiles being positioned on lower surfaces of the U-shaped portion and the tooth-rack being positioned on upper surfaces of the U-shaped profile for each end piece.

* * * * *